(12) United States Patent
Kitreotis

(10) Patent No.: US 9,361,743 B2
(45) Date of Patent: Jun. 7, 2016

(54) METHOD OF CONDUCTING AN ELECTRONIC LOTTERY

(75) Inventor: Pol Kitreotis, Nikosiya (CY)

(73) Assignee: SMERNAX HOLDING LIMITED, Nicosia (CY)

( * ) Notice: Subject to any disclaimer, the term of this patent is extended or adjusted under 35 U.S.C. 154(b) by 544 days.

(21) Appl. No.: 13/386,223

(22) PCT Filed: Apr. 29, 2010

(86) PCT No.: PCT/IB2010/001517
§ 371 (c)(1),
(2), (4) Date: Jan. 20, 2012

(87) PCT Pub. No.: WO2012/001439
PCT Pub. Date: Jan. 5, 2012

(65) Prior Publication Data
US 2013/0017878 A1    Jan. 17, 2013

(51) Int. Cl.
*G06F 17/00* (2006.01)
*G07C 15/00* (2006.01)
*G06Q 10/10* (2012.01)

(52) U.S. Cl.
CPC .............. *G07C 15/006* (2013.01); *G06Q 10/10* (2013.01)

(58) Field of Classification Search
CPC .................................................... G07F 17/329

USPC ....................................................... 463/16, 17
See application file for complete search history.

(56) References Cited

U.S. PATENT DOCUMENTS

| 2006/0178203 A1* | 8/2006 | Hughes .................. G07F 17/32 463/20 |
| 2008/0026811 A1* | 1/2008 | White et al. ..................... 463/17 |
| 2014/0155133 A1* | 6/2014 | Katz et al. ....................... 463/17 |

* cited by examiner

*Primary Examiner* — Reginald Renwick
(74) *Attorney, Agent, or Firm* — John Alumit

(57) ABSTRACT

The inventive method relates to an electronic lottery system, which contains a main lottery server, at least one local lottery server and lottery terminals. In addition, the lottery drawing is conducted by electronic lottery receipt identification. The main server previously forms electronic lottery receipts. Gambling and registration data are randomly placed into electronic packets, which are randomly transferred through at least one local lottery server to lottery terminals, where electronic lottery receipts are purchased by lottery participants. Electronic lottery receipts are used during the drawing; each receipt consists of at least two gambling segments sequentially opened by lottery participants. A matrix containing intersecting rows of gambling cells made with an ability to visualize at least on hidden designation of a drawing result. This method increases game attractiveness and interactivity, and radically increases the range of strategy selection when participating in a lottery.

1 Claim, No Drawings

METHOD OF CONDUCTING AN ELECTRONIC LOTTERY

CROSS-REFERENCE TO RELATED APPLICATION

This application is a national stage application and claims the benefit of the priority filing date in PCT/IB2010/001517 referenced in WIPO Publication WO/2012/001439. The earliest priority date claimed is Jul. 21, 2009.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention relates to a method of conducting a no-draw instant lottery, and can be used both for conducting lotteries, as well as contests, panel games, and various advertizing shows, etc.

Conducting lotteries using the same processing center is known, wherein electronic models of different lottery tickets are developed and an electronic lottery ticket database is created for bookkeeping data, gambling data and protection data, as well as electronic databases for lottery ticket drawings (see, for example, patents RF U.S. Pat. Nos. 2,334,274, 2,328,766, 2,294,784).

These methods provide an opportunity for using tickets with different types of gambling cards and conducting simultaneous drawings of different lotteries with their own prize funds, and using different gambling symbols. Lottery tickets are spread out through specialized sale terminals in accordance with a sale plan developed when preparing the lottery.

Common drawbacks of these methods include complications in managing the ticket-making and ticket-realization processes, as well as operator complications in controlling the functions of a unified processing center. Such complications cause distrust on the part of users as to the reliability of drawing results.

There is a method of conducting a lottery (RU, 2124230, MPK G 07 C 15/00, 1998) wherein the main drawing process is based on a subsequent and randomized numerical gap. A computer controls the coincidence of numbers with numerical sets of lottery tickets, identifies tickets where numerical sets coincide with winning numbers, and announces the winning ticket numbers and the amount of their prizes.

The drawbacks of this lottery method are that it requires specialized terminals for lottery tickets sale, independent communication channels for transferring lottery data, and blocks of preparation and drawing up of documents. These make the lottery process complicated and expensive.

The nearest technical solution is a method of conducting a lottery which relies on the use of identification cards to electronically produce lottery tickets. An identification data number for electronic lottery tickets is formed in a lottery part and is the basis for prize distributions. Prizes are included in the formed set of identification data, and the identification cards are used to store information on electronic lottery tickets. Then, the data of the existing identification cards is passed to the lottery part and sets of matching data of electronic lottery ticket numbers and identification card numbers are formed. After that, the data on the identification card numbers that correspond with the winning tickets are passed to a place the identification cards use to identify prizes in the electronic lottery ticket corresponding to the identification card. Then, in case of a winning electronic lottery ticket, the prize is paid at prize outpayments points (RU, 2160141, MPK A63F3/06, 2000). According to this patent, the lottery is conducted with the use of identification cards, and the lottery tickets are produced electronically for which the lottery conductors form a set of data for identification of electronic lottery tickets that serve as the basis for prize distribution.

The drawback of the above-mentioned method is the use of a table to link the identification cards to particular electronic tickets. This significantly limits the functional capabilities of organizers and participants when using the method. Moreover, there is a trust issue arising from the fact that the link of gambling numbers is known to certain groups of individuals.

The technical result of the proposed invention is as follows: to widen the functional capabilities and technical means when conducting an electronic lottery; the ability to use an electronic lottery receipt which is not limited to one gambling segment is shown on a lottery screen terminal; the ability to choose a visualization type of electronic receipt drawing process ("visualization") before the lottery begins; of the ability of participants to choose and specify the length and strategy of a drawing; and the ability to choose the graphic design of an electronic receipt and the choice of visualization.

SUMMARY

The proposed invention increases a participant's capability to choose more parameters and conditions for a drawing and to specify individual strategy for the lottery drawing. The mentioned technical result is achieved due to the fact that the electronic lottery method, for which an electronic lottery system containing a main lottery server, and at least one local server and lottery terminal are used, conducts a lottery drawings by identifying electronic lottery receipts which are formed before the lottery at the main server, and the gambling and identification information are put into electronic packets on a random basis, and then randomly passed through at least one local lottery server to lottery terminals where electronic lottery receipts are sold to lottery participants. Herewith, for the drawing, electronic lottery receipts are used. Each of them contains at least two subsequent gambling segments opened by a participant. The segments are in the form of at least one matrix, which consists of intersecting rows of gambling cells, made with the ability to visualize at least on drawing result symbol hidden in them.

Besides the choice of electronic lottery visualization, a receipt consists of at least two variants.

Other than passing from one gambling segment to the next, a gambling segment is accompanied by at least one visualization process.

Moreover, each segment of a receipt contains at least one positive numerical value multiplication field of the cell win.

Different cells may contain different mathematical models to identify a numeric value of a prize.

DESCRIPTION

The proposed method of conducting an instant electronic lottery uses a conceptually new approach to the drawing process. Electronic lottery receipts are generated at the main lottery server. Then, the generated receipts are randomly allocated "packets". A "packet" of a receipt goes to a local server on a random basis. An advantage of this is that an electronic lottery receipt is picked out from a database of the local server on a random basis at the moment of purchasing an electronic lottery receipt. In the mentioned method, an electronic lottery receipt is used consisting of at least two gambling segments where only one segment of an electronic receipt is used at one step of the lottery drawing. It is important that for implementing the described method, the electronic lottery receipt has at least two gambling segments. For convenience of conducting the lottery, it is preferable to place one segment of the lottery receipt on the gambling field. The next (previous) segments of the receipt may be placed out of sight on the display facility, as well as be seen partially or completely at the display facility. Information on the next (previous) segments of the receipt may be contained on at least one of the display facilities. The important thing is that in the simultaneous lottery drawing (step of the lottery drawing) one segment of an instant electronic lottery receipt participates, which is at least one matrix of M×N cells where M is a number of horizontal rows and N is a number of vertical rows. These factors allow the participant to specify a strategy and length of lottery drawing, as well as to choose his/her own mathematical model of prizes distribution among a given selection.

In the context of the present invention, the following notions are used:

- Gambling segment—the combination of cells on an electronic lottery receipt which are placed in a particular order and are at least one matrix M×N where M is a number of horizontal rows and N is a number of vertical rows.
- Visualization is a process of displaying the result of a lottery segment drawing on a screen using different visual effects.
- Display facility—tele-video information display facilities, in particular, a monitor of a lottery terminal; however, any other display facilities can be used, for example, an information display panel, a news ticker type panel, a projector type display facility, a final receipt with information, etc. Possible display facilities and means of displaying the process of an electronic lottery drawing, which match the implementation of the current patent, are not a subject for review of the current patent and are not described in detail. For a specialist, their presence and structure are obvious.
- Information input medium—under this notion, one should imply the input media mentioned below, which can be used both together (in any configuration) and separately from each other: terminal control keys, keypad, mouse, joystick, sensor panel on the terminal screen, identification cards information readers, etc. Information input medium are not described in detail in the current patent and are obvious for a specialist.
- Lottery drawing step—drawing of one gambling segment of an electronic lottery receipt by way of choosing and opening one gambling cell.
- Symbol—information in a gambling cell in the form of a symbol(s), sign(s), letter(s), picture(s), element(s), etc.
- Moving symbol—moving information in a gambling cell in the form of a symbol(s), sign(s), letter(s), picture(s), element(s), etc.
- "Scores" of a receipt—numeric value corresponding to the current result of a receipt drawing.

The suggested method is for using it on the lottery terminals, which contain at least one display facility and/or at least one mean of sound accompaniment. The method does not involve lottery equipment, which has hidden algorithms (including original texts of computer programs), data stores, hosts or aggregates unavailable for inspecting and testing by authorities, which control the lottery conducting processes. When using the suggested method the mathematical model of an electronic lottery is contained in a previously generated electronic lottery receipts array. The use of an electronic lottery receipt consisting of at least two segments allows for laying different mathematical models into different cells within one segment of an electronic lottery receipt. In the described method, it is preferable to use different mathematical models for different cells of a segment of an electronic lottery receipt depending on a lottery bet.

The lottery begins when the needed amount of electronic lottery receipts on the server (electronic lottery receipts issuing generating server) are reached. Then, the electronic lottery receipts are randomly allocated into the "packets". The receipts are stored in the main server in "packets." The number of receipts in a "packet" is determined by the conditions of the lottery drawing.

Information with parameters of an electronic lottery receipt drawing contained on the main server in the form of "packets" is passed to a local server by network exchange or other way. Issued electronic lottery receipts can be passed all together if there is only one local server, or in packets if there are more than one local servers.

It is important to mention that besides the network exchange, it is possible to transfer electronic lottery receipts on magnetic or optical media, for example, external hard drive, flash card, CD-ROM, DVD_ROM, etc. In this case, to implement the method of the current patent at least one additional server must be installed to which the lottery receipts packet is transferred.

In both cases, the collection, transfer and processing of the gambling information, and the forming and drawing of the lottery prize fund is conducted on a step-by-step basis. A local server is additionally installed at the lottery terminals. It is clear that servers and terminals can be connected by wire or wirelessly. In this case, the step-by-step basis of the system in the described method is determined by the ability to use connection channels for transferring a particular amount of electronic lottery receipts to a local server ("packet" of receipts), which further participates at electronic terminals. After the receipts drawing on the local server, a new "packet" of receipts comes from the main lottery server. The "packet" of electronic receipts on the main server is picked on a random basis and is sent to the local server.

The process of interaction of the main lottery server, local server and lottery server functions in the following way on a program level:

- the local server gets a "packet" of receipts from the lottery server, where the program of receipts issue is installed and the main receipts issue is kept;
- the database and the program of the gambling lottery server is installed on the local server;
- the dispatcher program connects to the local server program by means of a network data exchange as well as a program which ensures the display of the lottery drawing function on the lottery terminal;

the program, which ensures the display of a lottery drawing, gets the data on the electronic lottery receipt from the dispatcher program, while the dispatcher program gets information from the local server.

As a preferable variant, the Central lottery server is additionally installed, which is meant for keeping information on the lotteries conducted, transferring information on lotteries to the local servers, collecting and keeping information on all gambling and financial transactions, and processing and providing information to different groups of users. Lottery receipts issues are transferred to local servers via the Central lottery server.

It is worth mentioning that the means of information exchange among facilities and their sequence are not the subject of review of the current patent and are obvious for a specialist.

In a stand by mode, the lottery terminal displays information inviting the participant to take part in the lottery and conduct the electronic receipt drawing. The displayed information may contain both direct information on the lottery itself and information of other types, for example, advertising.

In order to conduct an electronic lottery, the terminal should be preferably equipped with information input medium necessary to participate in a lottery: at least one information display facility; at least one device to provide sound; a reading (definition) device for lottery participant's ID card; a bond receiver facility. It is necessary to say that this patent does not mean any terminal obvious for any specialist. That is why the facility furnishings should be made depending upon any electronic lottery to be conducted.

In the beginning of a premium drawing, a participant preferably uses an ID card, which gives access to a lottery terminal and manages the participant's account. In other case, access to a terminal may be provided by input into a bond funds receiver necessary to purchase an electronic lottery receipt. The funds are paid into a participant's account as a number value. It is better to derive this value at least to one lottery terminal display facility, like a monitor.

Afterwards, it is necessary to choose any method to register an electronic lottery receipt. It is possible to choose an electronic lottery receipt based on at least two options before the start of a premium drawing. There are six options to choose from in this preferred method. It is necessary to say that the selection on how to register a receipt should preferably be combined with stylistics, and the subject of visualization of the electronic lottery receipt drawing process should be combined with the proper mathematical model.

Hereinafter, we purchase a lottery receipt.

It is important to note that this lottery terminal may provide for a selection of at least two lotteries distinguishable by cost, edition and possible gain options, as well as by mathematical model.

An electronic lottery receipt consists of two segments. Each segment consists of at least one matrix. For this innovation, the preferable quantity of game segments is limited by two thousand, but evidently this quantity may be decreased or even increased, if necessary, which makes it possible to considerably prolong the participation process and interest in the lottery. It is evident that, in this case, the quantity of segments in the lottery receipt and the quantity of matrix in one segment may be determined by terms set by lottery organizers.

In this preferred option, a segment of an electronic receipt is totally situated on a display facility and consists of one matrix. The availability of the following electronic lottery receipt, or either previous segments thereof, is shown by arrow or any other sign or text indicating availability of other segments. The following (previous) receipt segments may be situated beyond a visual sector on a display facility, and become visible partially or totally at this display facility. While several display facilities are available for one electronic lottery terminal, it is better to input the gambling segment of an electronic lottery receipt at the main display facility, and to input information on the following and previous receipt segments at minor a minor display facility or facilities.

When purchasing an electronic receipt, the local server sends information to an electronic terminal about the electronic lottery receipt for gambling. It is important to note that, in this case, the selection of a lottery server receipt is carried out by chance.

The sequence of selection, registration and purchase of an electronic receipt is not a key moment, and may be defined by terms set by a lottery organizer.

Hereinafter, we choose and open cells in a gambling segment (one step of a lottery drawing) by way of an interface and information input medium(s). The choice of cell is to be made by taking into account the quantity of "points", i.e. the current definition of a receipt drawing. When choosing a value at the intersection of horizontal and vertical rows of the segment, a cell can be opened with the information about a lottery prize (or any part thereof).

The process interactivity of a cell top coating may be shown as its "deleting", "shedding", "breaking", "split", "breakage", "disappearance" etc. (hereinafter referred as "opening"). The cell consists of at least one result designation. The cell may contain a value equal to zero or a symbol corresponding to zero, and may be empty, which is also equal to a zero value.

In some cases, the number values in the cells may have a negative numeric value. If this negative value in the open cell increases the value in a "point" indicator, the process of this receipt drawing is considered finished. The lottery terminal returns to standby mode or to a selection menu, where it is possible to select any available receipt, or another receipt of the same type (in a receipt purchase menu) for the sequence drawing, depending on a participant's actions.

A gambling segment may additionally contain at least one multiplying margin defined in the cell. In this case, after a cell with a number value greater than zero (or a cell with a symbol corresponding to a number greater than zero) is opened when drawing one segment of a lottery receipt, it is possible to multiply a prize value by multiplying a margin value. If the cell number value is zero or negative (or the cell symbol corresponds to zero or to a negative number value), multiplying margins cannot be opened.

One option is to have one segment of an electronic lottery receipt containing several matrixes, one being a chief gambling matrix, and the others containing information on a risky game. A risky game is conducted by opening the proper cells in the additional segments, as well as by opening risky game margins at the display facility along with values corresponding to the values inside the risky game matrix cells.

It is important to note that the process of cell selection at the crossing of vertical and horizontal rows of a lottery electronic receipt may be accompanied by visualization.

The main task of the visualization process is to make a lottery drawing much more amazing and to increase lottery interactivity.

An open cell may contain numeric or symbolized information, or even moving symbolized information. In the event the information has no numeric value, it is better to make information on the prize number value conform to a symbol or symbol combination on the lottery terminal, or not far from it.

When a gambling cell corresponds to a lottery index, the number value of this cell is first displayed separately at a display facility, and afterwards transferred to an indicator (margin) as to "points".

It is important that the number value of a prize be properly defined as a sum (or product) or difference (or division) of segmental number values of one receipt. The formula for a lottery prize may be defined by lottery terms as a constant. In this case, it is better to use addition or multiplication to realize the invention.

When not constantly dependent upon opening cells, the number values may additionally contain a direction to arithmetic operation or symbol corresponding to a number value with a direction to arithmetic operation. In this case, the arithmetic operation will correspond to a sign defined in the cell: plus, minus, multiply, divide.

Another option for a prize number value may depend on the results of the last segment of an electronic lottery receipt in a drawing. In this case, the last segment is one on a lottery receipt which a participant voluntarily selected and in which the segment has a zero prize value, or a negative value, which increases an indicator value like "points;" or the last segment can be the last gambling segment in a receipt.

In the event the quantity of gambling segments defined by terms governing the lottery is finished, and the index in the margin "points" is more than zero, all the funds are automatically transferred to a participant's account making it possible to either purchase a new electronic lottery receipt or withdraw funds and finish participation in the lottery.

When purchasing a new receipt, the electronic lottery receipt drawing is repeated as mentioned above.

If there is no purchase of an electronic lottery receipt, the lottery terminal is in standby mode.

At any time during the lottery, information on the drawing of an electronic lottery receipt can be printed on paper.

When using several lottery terminals joined by one server, it is possible to install at least one facility for general display and/or at least one sound facility, which would make the lottery drawing more attractive, for example, dropping prizes at a particular electronic lottery terminal.

This option can increase game attractiveness and interactivity, and provide more freedom in strategy selection when taking part in the lottery.

What is claimed:

1. A method of conducting an instant electronic lottery using a terminal, the method comprising the steps of:
   a main lottery server generates electronic lottery receipts, and transfers said electronic lottery receipts to a local lottery server installed at lottery terminals;
   when a threshold of electronic lottery receipts on the local lottery server is reached, the main lottery server randomly allocates the electronic lottery receipts into packets of at least two gambling segments;
   the main lottery server sends said packets to the local lottery server which randomly selects only one of said at least two gambling segments for gambling, while non-selected segments are placed out of sight or partially or made completely visible on a display facility; said randomly selected segment consist of at least one matrix consisting of intersecting rows of gambling cells made with the ability to visualize at least one drawing result symbol, or prize, hidden in them; each gambling cell has either the same or different mathematical model to identify a numeric value of a prize, which may be zero or equivalent to zero;
   a participant chooses and opens cells in a gambling segment by way of an interface and information input mediums at a lottery terminal, where the electronic lottery receipts are purchased; and
   if the number values in the cells have a negative numeric value, and the negative value in the open cell increases the value in a point indicator, the process of a receipt drawing is finished and the lottery terminal returns to standby mode or to a selection menu, where it is possible to select another electronic lottery receipt for a sequence drawing; while if the gambling segments defined by terms governing the lottery is finished, and an index in margin points is more than zero, funds are automatically transferred to a participant's account.

* * * * *